United States Patent
Bang et al.

(10) Patent No.: US 9,851,489 B2
(45) Date of Patent: Dec. 26, 2017

(54) VIEWING ANGLE SWITCHABLE BACK LIGHT UNIT

(71) Applicants: LG Display Co., Ltd., Seoul (KR); Covestro Deutschland AG, Leverkusen (DE)

(72) Inventors: Hyungseok Bang, Gyeonggi-do (KR); Seungman Ryu, Gyeonggi-do (KR); Joobong Hyun, Seoul (KR); Friedrich-Karl Bruder, Krefeld (DE)

(73) Assignees: LG Display Co., Ltd., Seoul (KR); Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/184,349

(22) Filed: Jun. 16, 2016

(65) Prior Publication Data
US 2017/0010400 A1    Jan. 12, 2017

(30) Foreign Application Priority Data

Jul. 8, 2015  (KR) .................. 10-2015-0097107

(51) Int. Cl.
F21V 7/04 (2006.01)
F21V 8/00 (2006.01)
G02F 1/1335 (2006.01)

(52) U.S. Cl.
CPC ............ *G02B 6/002* (2013.01); *G02B 6/005* (2013.01); *G02B 6/0028* (2013.01);
(Continued)

(58) Field of Classification Search
CPC ..... G02B 6/002; G02B 6/0053; G02B 6/0031
(Continued)

(56) References Cited

U.S. PATENT DOCUMENTS

2007/0052882 A1   3/2007  Hwang et al.
2007/0058108 A1*  3/2007  Uehara .................. G02B 6/005
                                                  349/86
(Continued)

FOREIGN PATENT DOCUMENTS

CN   1940678 A   4/2007
EP   1760500 A2  3/2007
(Continued)

OTHER PUBLICATIONS

Taiwanese Office Action dated Nov. 15, 2016, issued in corresponding Taiwanese Patent Application No. 105119720.
(Continued)

*Primary Examiner* — Ahshik Kim
(74) *Attorney, Agent, or Firm* — Morgan, Lewis & Bockius LLP

(57) ABSTRACT

The present disclosure relates to a viewing angle switchable back light unit in which the general mode and the privacy mode in a liquid crystal display can be selected. The present disclosure suggests a thin film type back light unit comprising: a light guide film including a light entering part disposed at one side, a light changing part disposed at other side and a light guiding part connecting the light entering part and the light changing part; a light radiating part disposed on an upper surface of the light guide film; and a light source disposed at the light entering part of the light guide film. The light entering part includes a wedge light coupler and a light deflection element. The light changing part includes a light reflecting pattern. The light radiating part includes a light radiating film providing some of the collimated lights as back lights.

12 Claims, 11 Drawing Sheets

(52) U.S. Cl.
CPC ..... G02B 6/0055 (2013.01); G02F 1/133615 (2013.01); *G02B 6/0068* (2013.01); *G02B 6/0073* (2013.01)

(58) Field of Classification Search
USPC ........................................................ 362/607
See application file for complete search history.

(56) References Cited

U.S. PATENT DOCUMENTS

| | | |
|---|---|---|
| 2007/0076434 A1 | 4/2007 | Uehara et al. |
| 2011/0227487 A1* | 9/2011 | Nichol ................. G02B 6/0018 315/158 |
| 2012/0069550 A1* | 3/2012 | Tung ...................... G09F 13/18 362/97.1 |
| 2012/0105765 A1 | 5/2012 | Kawai et al. |
| 2012/0235891 A1 | 9/2012 | Nishitani et al. |
| 2014/0286050 A1 | 9/2014 | Wang He et al. |
| 2015/0185393 A1 | 7/2015 | Bang et al. |
| 2016/0091648 A1 | 3/2016 | Bang et al. |
| 2017/0116937 A1* | 4/2017 | Du ....................... G09G 3/3644 |

FOREIGN PATENT DOCUMENTS

| | | |
|---|---|---|
| JP | 2000-249837 A | 9/2000 |
| JP | 2006-066282 A | 3/2006 |
| JP | 2006-106074 A | 4/2006 |
| JP | 2007-073516 A | 3/2007 |
| JP | 2007-087647 A | 4/2007 |
| JP | 2011-028008 A | 2/2011 |
| JP | 2012-099291 A | 5/2012 |
| JP | 2013-037845 A | 2/2013 |
| KR | 2015-0065137 A | 6/2015 |
| TW | 201202799 A | 1/2012 |

OTHER PUBLICATIONS

Extended European Search Report dated Dec. 13, 2016, for corresponding European Patent Application No. 16176605.0.
Japanese Office Action dated May 30, 2017, issued in corresponding Japanese Patent Application No. 2016-128456.

* cited by examiner

VIEWING ANGLE SWITCHABLE BACK LIGHT UNIT

This application claims the benefit of Korea Patent Application No. 10-2015-097107 filed on Jul. 8, 2015, which is incorporated herein by reference for all purposes as if fully set forth herein.

BACKGROUND OF THE INVENTION

Field of the Invention

The present disclosure relates to a viewing angle switchable back light unit in which the general mode and the privacy mode in a liquid crystal display can be selected, and more particularly, to a back light unit in which the display information can be suggested within a specific viewing angle in a liquid crystal display by using an ultra thin light guide film.

Discussion of the Related Art

Nowadays, due to the characteristics of light weight, slim thickness, low consumption electric power, the liquid crystal display device (or, LCD) is widely applied more and more. The LCD is applied to the portable computer such as note book PC, the official automation devices, the audio/video devices, the advertizing display device for indoor or outdoor, and so on. The transmittive type LCD, the most used type, represents the video images by modulating the luminescence of the light incident from the backlight unit by controlling the electric field applied to the liquid crystal layer.

Typically, there are two types of back light unit, the one type is the direct type and the other is the edge type. The direct type back light unit has a structure in which a plurality of optical sheets and a diffusion plate are stacked under the liquid crystal panel and a plurality of light sources are disposed under the diffusion plate. FIG. 1 is a cross sectional view illustrating a structure of the liquid crystal display having the direct type back light unit including the light emitting diode (or, LED) array as the light source according to the related art.

The direct type back light unit DBLU includes a light source disposed under a liquid crystal panel LCP and radiating the back light directly to the liquid crystal panel LCP. The light source may be a thin fluorescent lamp. Otherwise, as shown in FIG. 1, the light source may be the LED array LEDAR having a lower power consumption and enhanced luminescence. The LED array LEDAR is disposed in a matrix manner on the bottom surface of the case CASE. The case CASE may be installed at the cover bottom CB. In some cases, the case CASE may be omitted, and the LED array LEDAR may be disposed at the cover bottom CB directly. On the LED array LEDAR, a diffusion plate DIFF is disposed. The diffusion plate DIFF diffuses the back light from the LED array LEDAR to provide the evenly scattered back light over the light incident surface of the liquid crystal panel LCP. Between the diffusion plate DIFF and the liquid crystal panel LCP, a plurality of optical sheets OPT may be disposed. The optical sheets OPT include one or more prism sheet, one or more diffusion sheet, and/or a dual brightness enhancement film (or DBEF). The prism sheet converses the scattered and/or diffused back light by the diffusion plate DIFF to the liquid crystal panel LCP for enhancing the brightness of the back light. The diffusion sheet diffuses again the conversed back light by the prism sheet over the liquid crystal panel LCP to having evenly distributed luminescence.

A guide panel GP wraps and/or surrounds the side surfaces of the liquid crystal panel LCP and the direct type back light unit DBLU and supports the liquid crystal panel LCP by inserting between the liquid crystal panel LCP and the optical sheets OPT. The cover bottom CB wraps and/or surrounds the case CASE and the bottom surface of the direct type back light unit. On the bottom surface of the case CASE having the LED array LEDAR, a reflective sheet REF is disposed to reflect the back light leaked from the diffusion plate DIFF and/or the optical sheets OPT to the liquid crystal panel LCP. The top case TP surrounds the upper edge of the liquid crystal panel LCP and the side surface of the guide panel GP.

In the interim, the edge type back light unit may have thinner thickness than the direct type back light unit. Currently, the liquid crystal display devices have the LED light source rather than the fluorescent lamp. Especially, due to the easy installation of the light source, the edge type back light unit, in which LED light sources are disposed at the side surface of the liquid crystal panel, is more widely applied.

Hereinafter, referring to FIG. 2, we will explain about the edge type back light unit. FIG. 2 is a cross sectional view illustrating a structure of the liquid crystal display having the edge type back light unit including the light emitting diode array as the light source according to the related art.

Referring to FIG. 2, the edge type back light unit comprises a cover bottom CB, a light guide LG disposed at a bottom surface of the cover bottom CB, and light source disposed between the side surface of the light guide LG and the cover bottom CB and providing the back light to the side surface of the light guide LG. The light source may be a thin fluorescent lamp. Otherwise, as shown in FIG. 1, the light source may be the LED array LEDAR having a lower power consumption and enhanced luminescence. The light source may be disposed at the side surface of the light guide LG using the installing means like housing. The light guide LG receives the back light from the LED array LEDAR and refracts the direction of the back light as being perpendicular to the light incident surface of the liquid crystal panel LCP. Between the light guide LG and the liquid crystal panel LCP, a plurality of optical sheets OPT is disposed. The optical sheets OPT include one or more prism sheet, and one or more diffusion sheet for scattering and/or diffusing the back light from the light guide LG. To enhance the brightness and/or luminescence, the optical sheets OPT may further include a dual brightness enhancement film (or DBEF).

The guide panel GP wraps and/or surrounds the side surfaces of the liquid crystal panel LCP and the edge type back light unit, and supports the liquid crystal panel LCP by inserting between the liquid crystal panel LCP and the optical sheets OPT. Between the cover bottom CB and the light guide LG, a reflective sheet REF is disposed to reflect the back light leaked from the diffusion plate DIFF and/or the optical sheets OPT to the liquid crystal panel LCP. The top case TP surrounds the upper edge of the liquid crystal panel LCP and the side surface of the guide panel GP.

As mentioned above, the liquid crystal display, one example of non-self luminance display, should have the back light unit. The back light unit would be configured to suggest the back light evenly distributed over the whole surface of the liquid crystal panel. Therefore, various optical devices and/or means for transforming a light from the point light source or the line light source to a light from the plane light source. Further, considering the optical characteristics and structures of these optical devices and/or means, the back light unit would have some thickness. Even though the flat type displays including the liquid crystal display are remarkably thinned than the conventional display like CRT (i.e., cathode ray tube), more advanced technology for developing new back light unit suitable for much thinner and lower power consumption display device is required.

The light system according to the related art mentioned above may be applied in the back light unit in the non-self luminance display such as the liquid crystal display. The back light unit is disposed at the rear side of the liquid crystal display for providing the back light to the front side where the observer is located. The back light unit is designed as to radiate the back light to the front direction with evenly distributed luminances.

In most cases, the liquid crystal display provides the video information to all people who can look the front surface of the display. However, in some cases, the liquid crystal display may be designed to provide its video information to specific person positioned in the just front side of the display. For examples of the television sets or the outdoor information displays, it is preferable that the displays are designed to provide good video quality to the public people as many as possible. In that case, the back light unit would have the wide viewing angle of 180 degree and even luminance distribution characteristics over the whole surface of the display. On the contrary, for the personal portable display, it is preferable that the display may be selected as to operate in the privacy mode in which the display can provide the video information just to the person who own the device. The most back light unit cannot be selectively controlled as to be the privacy mode (operating in the narrow viewing angle) or the general mode (operating in the wide viewing angle).

The only way to select between the privacy mode and the general mode is to attach the privacy optical film on the display surface or disattach the privacy optical film from the display surface. More detail, when the privacy optical film is disposed on the front surface of the liquid crystal display, the display can be used in the privacy mode in which the display information can be observed only by the person located just in front of the display. In that case, if the display has certain additional device such as the touch panel, the privacy optical film is added on the additional device so that the additional device may not operate normally. Further, it is somewhat annoying or not easy for user to manage the privacy optical film.

SUMMARY OF THE INVENTION

Accordingly, the present invention is directed to a viewing angle switchable back light unit that substantially obviates one or more of the problems due to limitations and disadvantages of the related art.

An object of the present invention is to provide an ultra thin film type back light unit applied to a flat panel display.

Another object of the present invention is to provide an ultra thin film type back light unit for the flat panel display in which the user can select the narrow viewing angle mode and the wide viewing angle mode.

Still another object of the present invention is to provide an ultra thin film type back light unit which can be applied to the multi purpose light system in which the narrow radiating angle (for the search light system) and the wide radiating angle (for the general light system) can be freely selected.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a thin film type back light unit comprises a light guide film including a light entering part disposed at one side, a light changing part disposed at other side and a light guiding part connecting the light entering part and the light changing part; a light radiating part disposed on an upper surface of the light guide film; and a light source disposed at the light entering part of the light guide film, wherein the light entering part includes: a wedge light coupler converting expanded incident lights provide from the light source into vertical semi-collimated lights having a narrow expanding angle on a horizontal plane and being semi-collimated on a vertical plane; and a light deflection element converting the vertical semi-collimated lights received from the wedge light coupler into vertical collimated lights on the vertical plane satisfying a total reflection condition within the light guiding part, wherein the light changing part includes: a light reflecting pattern for coverting the vertical collimated lights received from the light guiding part into collimated lights being further collimated on the horizontal plane, breaking the total reflection condition within the light guiding part and satisfying a total reflection condition at the interface with the light radiating part, and for sending the collimated lights to the light guiding part, wherein the light radiating part includes: a light radiating film providing some of the collimated lights as back lights and reflecting others of the collimated lights into the light guiding part.

In one embodiment, the back light unit further comprises: a light absorbing pattern being disposed between the wedge light coupler and the light radiating part and absorbing some of the vertical collimated lights unsatisfying the total reflection condition within the light guiding part.

In one embodiment, the light guiding part includes: a high refractive film; and a low refractive film attached on any one of an upper surface and a bottom surface of the height refractive film. Further, the light radiating pattern includes any one of a surface grating film and a volume grating film attaching on outer surface of the lower refractive film.

In one embodiment, the wedge light coupler includes: a horizontal wedge part disposed close to the light source; and a vertical wedge part extended from the horizontal wedge part.

In one embodiment, the horizontal wedge part includes: a light incident surface disposed close to the light source and having a height and a width corresponding to a size of the light source; an upper surface and a bottom surface extended to one direction with a distance and expanded with a expanded angle; and two side surfaces having a height corresponding to the height of the light incident surface and a length corresponding to the certain distance, wherein the vertical wedge part includes an inclined surface extended to the one direction from the horizontal wedge part in which the height of the two side surfaces are linearly reduced from the upper surface to the bottom surface along to a length of the vertical wedge part.

In one embodiment, a plurality of the horizontal wedge part is disposed along to a side of the vertical wedge part which is perpendicular to the one direction. Further a plurality of the light source is disposed close to a plurality of the light incident surface one by one.

In one embodiment, the light guiding part sends the vertical collimated lights from the light entering part to the light changing part by repeating the total reflection. Further the light guiding part refracts some of the collimated lights to the light radiating part and sends others of the collimated lights from the light changing part to the light entering part.

In one embodiment, the wedge light coupler is disposed at one side close to the light source, on an upper surface of the high refractive film. The light deflection element is disposed under the bottom surface of the high refractive film as facing with the wedge light coupler. The low refractive film is attached on the upper surface of the high refractive film. The light reflecting pattern is disposed at an opposite side to the wedge light coupler, on the upper surface of the high refractive film. The light radiating film is attached on an upper surface of the low refractive film.

In one embodiment, the wedge light coupler is disposed at one side close to the light source, on an upper surface of the high refractive film. The light deflection element is disposed under the wedge light coupler, on an upper surface of the high refractive film. The low refractive film is attached on the upper surface of the high refractive film. The light reflecting pattern is disposed at an opposite side to the wedge light coupler, on the upper surface of the high refractive film. The light radiating film is attached on an upper surface of the low refractive film.

In one embodiment, the wedge light coupler is disposed at one side close to the light source, on an upper surface of the high refractive film. The light deflection element is disposed as facing with the wedge light coupler, under a bottom surface of the high refractive film. The low refractive film is attached close to the wedge light coupler, under the bottom surface of the high refractive film. The light reflecting pattern is disposed at an opposite side to the wedge light coupler, under the bottom surface of the high refractive film. The light radiating film is attached under a bottom surface of the low refractive film.

In one embodiment, the back light system further comprises: a switchable light scattering film disposed on the light guide film.

In one embodiment, the back light system further comprises: any one of a direct type back light unit and an edge type back light unit disposed under the light guide film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Figure 1:
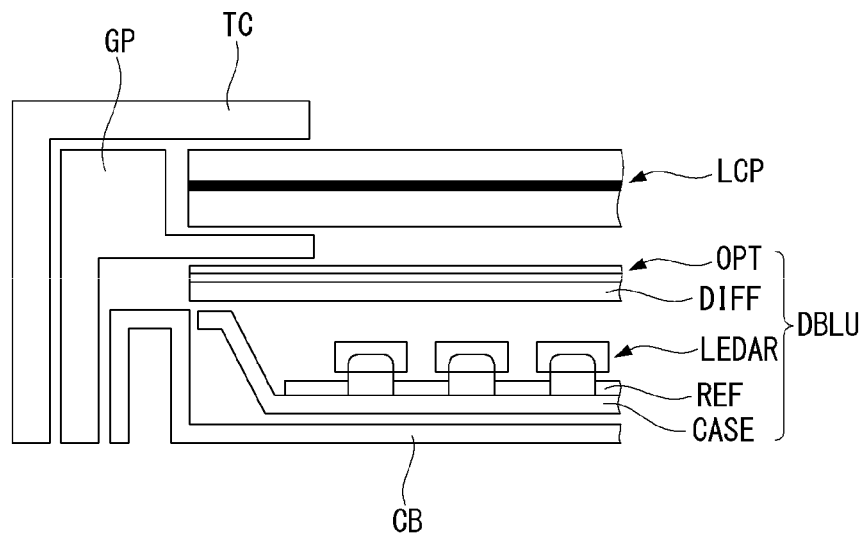
FIG. 1 is a cross sectional view illustrating a structure of the liquid crystal display having the direct type back light unit including the light emitting diode array as the light source according to the related art.
Figure 2:
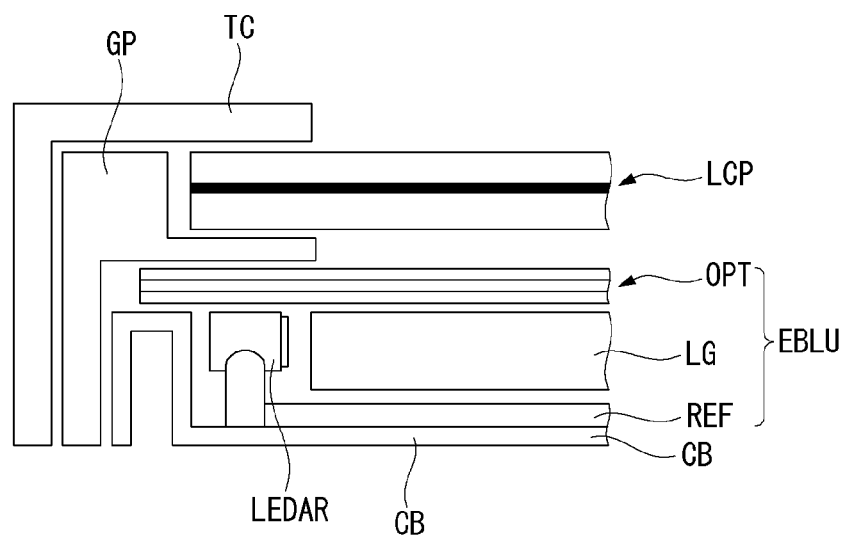
FIG. 2 is a cross sectional view illustrating a structure of the liquid crystal display having the edge type back light unit including the light emitting diode array as the light source according to the related art.

Referring to attached figures, we will explain preferred embodiments of the present disclosure. Like reference numerals designate like elements throughout the detailed description. However, the present disclosure is not restricted by these embodiments but can be applied to various changes or modifications without changing the technical spirit. In the following embodiments, the names of the elements are selected by considering the easiness for explanation so that they may be different from actual names.

First Embodiment

Figure 3:
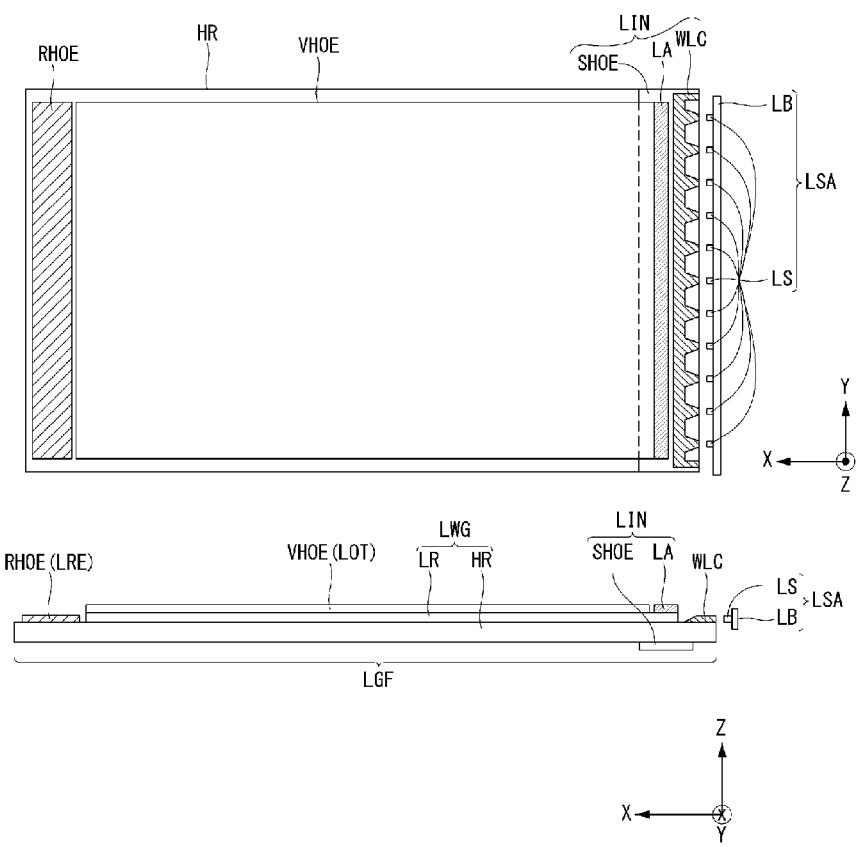
FIG. 3 is a diagram illustrating a structure of an ultra thin film type back light unit according to the first embodiment of the present disclosure.

FIG. 3 is a diagram illustrating a structure of an ultra thin film type back light unit according to the first embodiment of the present disclosure. In FIG. 3, the above part is a plane view, as seeing from upside of the thin film type back light unit, and the below part is a side view, as seeing from lateral side. In convenience, the coordinate diagram is noticed at one corner of the figures.

Referring to the FIG. 3, the ultra thin film type back light unit according to the first embodiment of the present disclosure comprises a light guide film LGF and a light source array LSA disposed at one side of the light guide film LGF. The light guide film LGF includes a light entering part LIN, a light guiding part LWG, a light changing part LRE and a light radiating part LOT. The light source array LSA includes a plurality of light sources LS and a light source board LB having the plurality of the light sources LS in certain array manner and a circuit for providing the electric power to the light sources LS.

At first, we will explain about the light source array LSA in detail. The back light unit according to the present disclosure is an ultra thin film type device for converting or changing the collimated light from the point light sources into the surface light source using the holography technology. Therefore, it is preferable that the light source LS may be a point light source for providing a collimated light. For example, the light source LS may include a laser diode. However, the laser diode is very expensive to apply to the general purpose devices and it may generate the extreme heat. Further, it is very hard that the laser diode is applied to the general purpose back light unit. Therefore, in the first embodiment of the present disclosure, it is preferable that that the general light emitting diode may be used for the light source LS which is inexpensive and generates relatively lower heat.

The normal light emitting diode may not provide the collimated light but the expanded light having the 60~150 degree of expanded angle. When using the expanded lights, the light losses may be high. Even though various methods for reducing the loss of the expanded lights can be applied, the loss of lights would be inevitable. For the large area liquid crystal display or the outdoor liquid crystal display, much higher luminance should be ensured. To do so, it is preferable that a plurality of light sources LS is included.

Considering the above mentioned situations, the light source array LSA may include a plurality of light sources LS disposed in an arraying manner. For example, the light source array LSA may include a light source board LSB and a plurality of light sources LS arrayed on the surface of the light source board LSB along to one horizontal line with certain gap. Even though not shown in figures, the light source board LSB may include the wiring lines and/or the driving circuits for supplying the electric power and signals to the light sources LS. There are many types for the circuit boards or the driving circuits so that the detailed explanation would not be mentioned in this specification.

The arraying manner for the light sources LS in the light source array LSA may be various. The most important things are those; the light amounts for enough luminance are ensured and the expanded lights are converted and changed into the collimated lights. Therefore, it is preferable that the arraying manner is decided by the structure or the optical function and/or characteristics of the light guide film LGF. The arraying manner of the light source LS may be variously applied by the designer according to the physical structure and the optical characteristics of the light guide film LGF explained in below.

The light entering part LIN of the light guide film LGF receives a light from the light source LS disposed on the light source array LSA. The light from the light source LS is radiated and/or expanded as the corn type of which central axis is on the direction of the lights. For example, the light radiated from the light source LS may enter into the light guide film LGF having the expanded angle of 60-80 degree in one side direction from the axis of the light direction.

The light entering part LIN comprises a wedge light coupler WLC and a light deflection element SHOE. Further, a light absorbing element LA may be included. The wedge light coupler WLC is the optical element for converting and/or changing the light supplied from the light source LS into the lights having the narrow viewing angle (or 'collimated'), both on the horizontal plane (XY plane) and on the vertical plane (XZ plane). The light deflection element SHOE is a holographic element for sending the narrow viewing angled lights by the wedge light coupler WLC to the light guiding part LWG. Especially, the light deflection element SHOE is the holographic element for controlling the incident angle of the narrow viewing angled lights (or 'collimated lights') to satisfy the total reflection condition within the light guiding part LWG so that the narrow viewing angled lights can be guided into the light guiding part LWG without any loss of the light.

The light guiding part LWG is the element for receiving the collimated light at the light entering part LIN and for sending it to the opposite side of the light entering part LIN without any loss of the collimated light. The light guiding part LWG may include a high refractive layer HR and a low refractive layer LR stacked on the upper surface of the high refractive layer HR. All of the collimated light entering into the light entering part LIN may be reflected within the high refractive layer HR and be guided from the light entering part LIN to the light converting part LRE located at the opposite side to the light entering part LIN.

The light converting part LRE changes the incident angle of the collimated light guiding into the high refractive layer HR of light guiding part LWG with the total reflection condition so as to satisfy the total reflection condition at the lower surface of the high refractive layer HR but to break the total reflection condition at the upper surface of the high refractive layer HR, the interface between the high refractive layer HR and the low refractive layer LR. Further, the light converting part LRE resends the collimated light from the light guiding part LWG back to the light guiding part LWG. Here, the light converting part LRE much highly collimates the collimated light received from the light guiding part LWG, on the horizontal plane. The light converting part LRE changes the incident angle of the light received from the light guiding part LWG and resends it to the light guiding part LWG so as to go to the light entering part LIN. Here, the reguided colliated light enters into the low refractive layer LR. It is preferable that the light converting part LRE may have a light reflecting element RHOE having a holographic pattern by which the collimated light received from the light guiding part LWG is highly collimated on the horizontal plane and the incident angle of the collimated light is changed into a second incident angle which the total reflection condition at the interface between the high refractive layer HR and the low refractive layer LR is broken.

The collimated light having the second incident angle breaking the total reflection condition between the high refractive layer HR and the low refractive layer LR enters into the low refractive layer LR and goes to the upper surface of the low refractive layer LR. At the upper surface of the low refractive layer LR, the light radiating part LOT is disposed. The light radiating part LOT is a light radiating film VHOE including an optical element of which refractive index is higher than that of the low refractive layer LR. For example, the light radiating film VHOE may be a surface grating film or a volume grating film. At the interface between the low refractive layer LR and the light radiating part LOT, some parts of the light goes out of the light radiating part LOT and other parts of the light goes back into the low refractive layer LR by reflection. The return light into the low refractive layer LR enters into the high refractive layer HR, it is reflected at the bottom surface of the high refractive layer HR, and then reenters into the low refractive layer LR. Repeating these processes, the collimated light would be guided from the light converting part LRE to the light entering part LIN as some of the collimated light go out through the light radiating part LOT.

Until now, referring to FIG. 3, we explained about the whole structure and the operation of the ultra thin film type back light unit according to the first embodiment of the present disclosure. Hereinafter, referring to FIGS. 4 to 12, we will explain about each element of the ultra thin film type back light unit according to the first embodiment, in detail.

Figure 4:
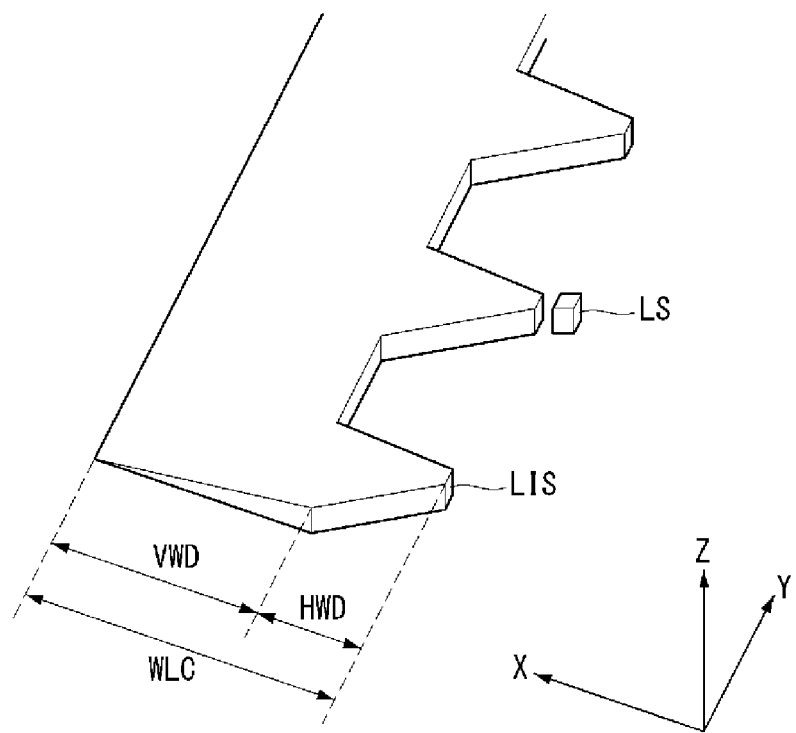
FIG. 4 is a perspective view illustrating the relationship between a wedge light coupler (or 'light incident element') and a light source according to the present disclosure.
Figure 5:
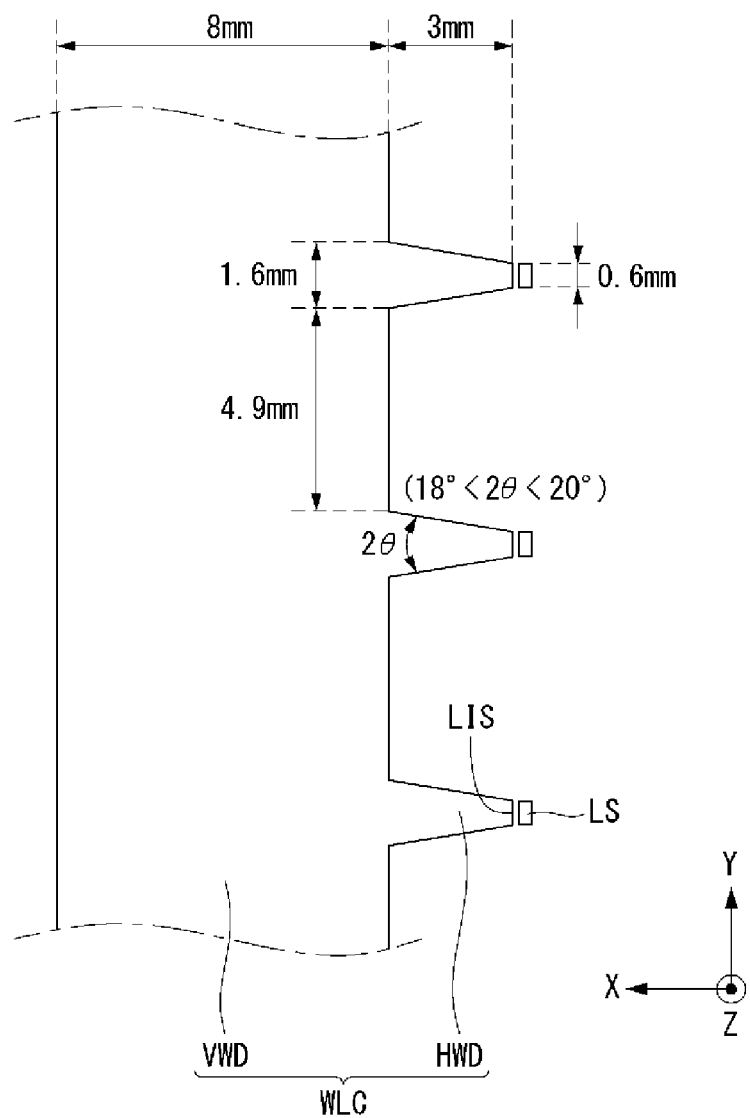
FIG. 5 is a plane view illustrating the structure of the wedge light coupler according to the present disclosure.
Figure 6:
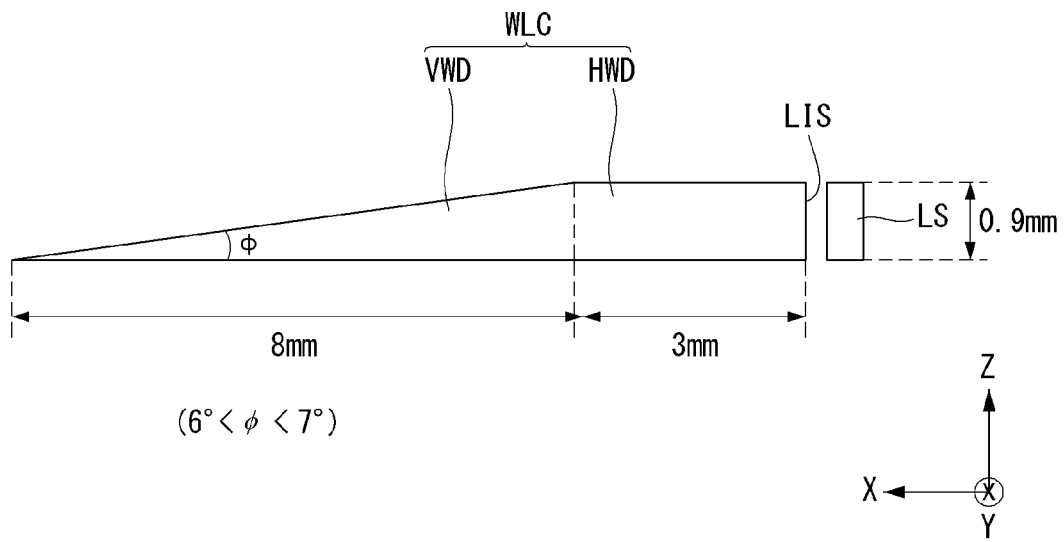
FIG. 6 is a side view illustrating the structure of the wedge light coupler according to the present disclosure.

Referring to FIGS. 4 to 6, we will explain about the light incident element included into the ultra thin film type back light unit according to the present disclosure. FIG. 4 is a perspective view illustrating the relationship between a wedge light coupler (or 'light incident element') and a light source according to the present disclosure. FIG. 5 is a plane view illustrating the structure of the wedge light coupler according to the present disclosure. FIG. 6 is a side view illustrating the structure of the wedge light coupler according to the present disclosure.

The wedge light coupler WLC of the ultra thin film type back light unit according to the present disclosure comprises a light incident surface LIS facing with the light source LS, a horizontal wedge part HWD controlling the incident light into the light incident surface LIS as having a narrow expanding angle on the horizontal plane (XY plane) and a vertical wedge part VWD controlling the incident light as having a narrow expanding angle on the vertical plane (XZ plane).

It is preferable that the light incident surface LIS has the size corresponding to the surface of the light radiating surface of the light source LS. For example, considering the size of the light source LS, the light incident surface LIS may have a rectangular shape of which height may be 0.9 mm and the width may be 0.6 mm.

The horizontal wedge part HWD has a V shape, a wedge shape or a funnel shape which side surfaces are expanded in certain expanding angle with a first distance from the light incident surface LIS, on the horizontal plane (XY plane). In the interim, on the vertical plane (XZ plane), it is extended along to the first distance with the same height. For example, the horizontal wedge part HWD may have a rectangular truncated pyramid from the light incident surface LIS to the rectangular surface having height of 0.9 mm and width of 1.6 mm along to the 3 mm distance (or length). That is, the horizontal expanding angle (2θ) of the horizontal wedge part HWD may be about 18.92 degree. The horizontal expanding angle (2θ) may be variously decided by the designer. Considering the size of the most manufactured liquid crystal display, the horizontal expanding angle (2θ) may preferably be 18~20 degree.

The vertical wedge part VWD is extended from and/or linked to the horizontal wedge part HWD. On the horizontal plane (XY plane), the vertical wedge part VWD may be extended with a second distance having the same width. In the interim, on the horizontal plane (XZ plane), the upper surface is converged from the upper surface of the light incident surface LIS to the bottom surface along to the second distance (or length). For example, the cross sectional shape may be a right triangle of which height is 0.9 mm and the base line is 8 mm. That is, the vertical wedge part VWD may have a wedge shape which is starting from the horizontal wedge part HWD and of which vertical inclined angle (φ) may be about 6.34 degree. The vertical inclined angle (φ) may variously be decided by the designer. Considering the refraction ratio of the high refractive film HR of the light guide film LGF and the total reflection angle into the high refractive film HR, the vertical inclined angle (φ) may preferably be 6~7 degree.

A plurality of the horizontal wedge parts HWD may be arrayed along to the Y axis with certain gap. The vertical wedge part VWD may preferably have the shape linking all end surface of the plurality of the horizontal wedge HWD. The arraying gap and the numbers of the plurality of the horizontal wedge parts HWD may be decided by the narrowed horizontal expanding angle controlled by the horizontal wedge part HWD and the distance to the light reflecting element RHOE disposed at the light converting part LRE. For example, considering the sizes of the mostly used and manufactured liquid crystal display, the plurality of the horizontal wedge parts HWD may be arrayed along to the Y axis of the vertical wedge part VWD with the gap of 4.9 mm between each horizontal wedge parts HWD.

Figure 7:
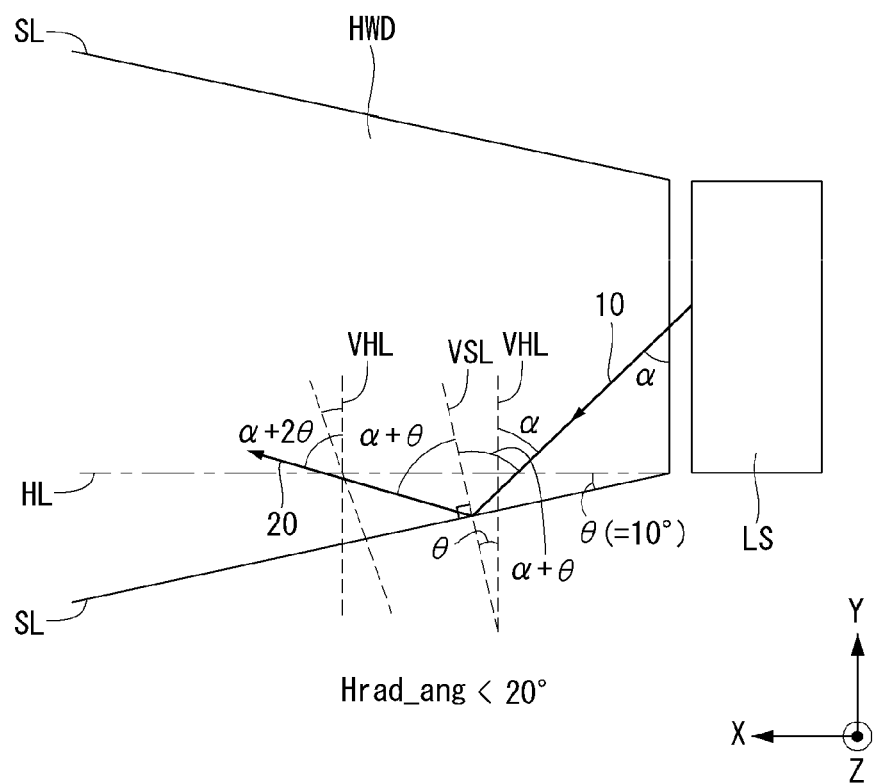
FIG. 7 is a horizontal plane view, in the XY plane, illustrating a light path in the wedge light coupler according to the present disclosure.
Figure 8:
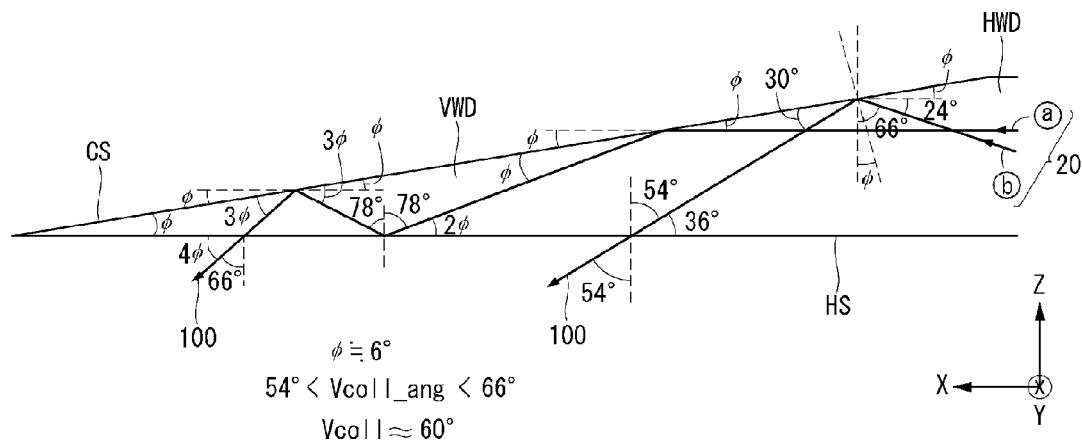
FIG. 8 is a vertical plane view, in the XZ plane, illustrating a light path in the wedge light coupler according to the present disclosure.

Next, referring to FIGS. 7 and 8, we will explain about the optical function of the wedge light coupler WLC of the ultra thin film type black light unit according to the present disclosure. FIG. 7 is a horizontal plane view, in the XY plane, illustrating a light path in the wedge light coupler according to the present disclosure. FIG. 8 is a vertical plane view, in the XZ plane, illustrating a light path in the wedge light coupler according to the present disclosure.

Referring to FIG. 7, we will explain about the changes of the light path by the horizontal wedge parts HWD. The (incident) light 10 from the light source LS enters into the horizontal wedge parts HWD. The incident light 10 is the expanded light having certain expanding angle from axis of the light direction, on the horizontal plane (XY plane). The horizontal wedge parts HWD has two side surfaces SL extending along to the horizontal expanding angle (2θ). That is, each of two side surfaces SL has the horizontal inclined angle (θ) from the horizontal line HL. The incident light 10 having the incident angle α degree to the side surface SL having the horizontal inclined angle (θ) is reflected by the side surface SL so that the incident angle may be changed into (α+2θ) by the horizontal inclined angle (θ).

Among the incident lights 10, all of the lights having the incident angle less than the total reflection condition at the side surface SL of the horizontal wedge parts HWD are reflected by the side surface SL so that go to the light direction (X axis). Some of the lights having the incident angle larger than the total reflection condition are reflected and others may be leaked out of the horizontal wedge parts HWD. As the two side surfaces have the horizontal expanding angle (2θ) of 20 degree, the amount of leaked lights may be minimized. As mentioned above, the incident angle of the reflected lights by the side surface SL is getting lowered as many as being reflected. As the results, the incident light 10 has the horizontal radiation angle (Hrad_ang) is less than 20 degree on the horizontal plane (XY plane). That is, the incident light 10 would be a narrow viewing angled light 20 satisfying: the horizontal radiation angle (Hrad_ang)<20 degree.

Next, referring to FIG. 8, we will explain about the changes of the light path by the vertical wedge part VWD. The narrow viewing angled light 20 of which horizontal radiation angle (Hrad_ang) is controlled as being less than 20 degree by the horizontal wedge parts HWD enters into the vertical wedge part VWD. The vertical wedge part VWD comprises a horizontal surface HS and an inclined surface CS. On the vertical plane (XZ plane), the narrow viewing angled light 20 is not collimated or its expanding angle is not controlled in narrow range. However, by the inclined surface CS, the narrow viewing angled light 20 may be semi-collimated on the vertical plane (XZ plane) so that is called as a vertical semi-collimated light 100.

FIG. 8 shows how the narrow viewing angled light 20 is converted into the vertical semi-collimated light 100. For example of that the inclined angle of the inclined surface CS is about 6 degree, the horizontal light (a) among the narrow viewing angled lights 20 may be reflected three times by the inclined surface CS and then go out of the wedge light coupler WLC with having the incident angle (or refractive angle) of 66 degree or less. In the interim, the expanded lights (b) among the narrow viewing angled lights 20 may be reflected one time or two times by the inclined surface CS and then go out of the wedge light coupler WLC with having the incident angle (or refractive angle) of 54 degree or more.

Consequently, the incident light 10 from the light source LS is converted into the narrow viewing angled light 20 having the expanding angle of 20 degree on the horizontal plane (XY plane) by the horizontal wedge part HWD of the wedge light coupler WLC. After that, the narrow viewing angled light 20 is converted into the vertical semi-collimated light 100 which having the semi-collimated angle Vcoll around 60 degree on the vertical plane (XZ plane) by the vertical wedge part VWD. That is, the vertical semi-collimated light 100 having the narrow expanding angle on the horizontal plane goes out from the wedge light coupler WLC and enters into the high refractive layer HR.

Here, on the horizontal plane, as the expanding angle is about 20 degree, it is not decided as being collimated but decided as having a narrow expanding angle. On the contrary, on the vertical plane, as the range of the expanding angle is less than 12 degree, we decided as being semi-collimated. The semi-collimation means that the expanding angle is less than 15 degree (close to collimated condition) even though it is not perfectly collimated as the LASER.

Figure 9:
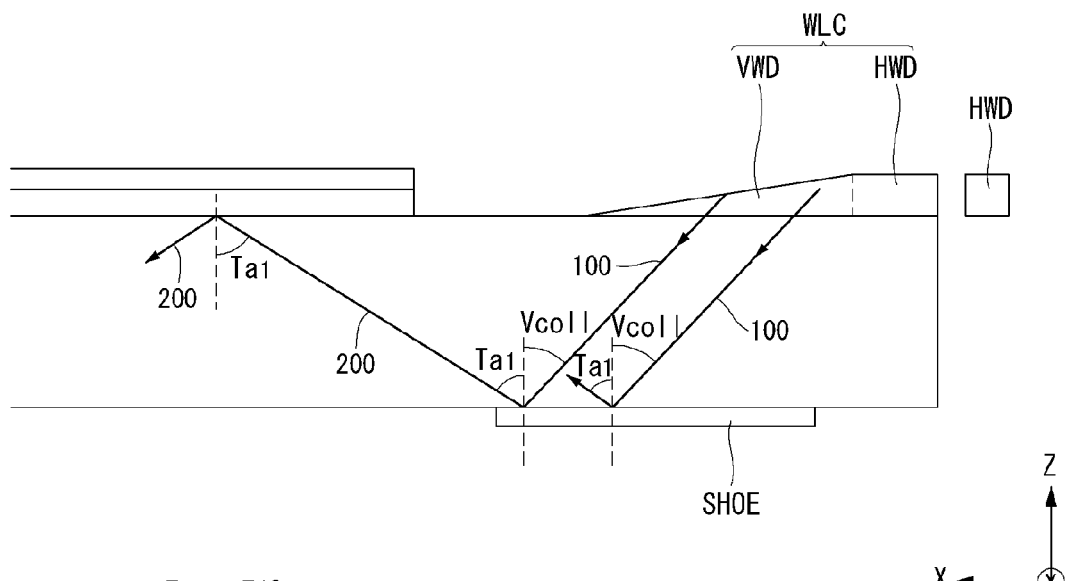
FIG. 9 is a vertical side view, in the XZ plane, illustrating a light path by a light deflection element according to the present disclosure.
Figure 10:
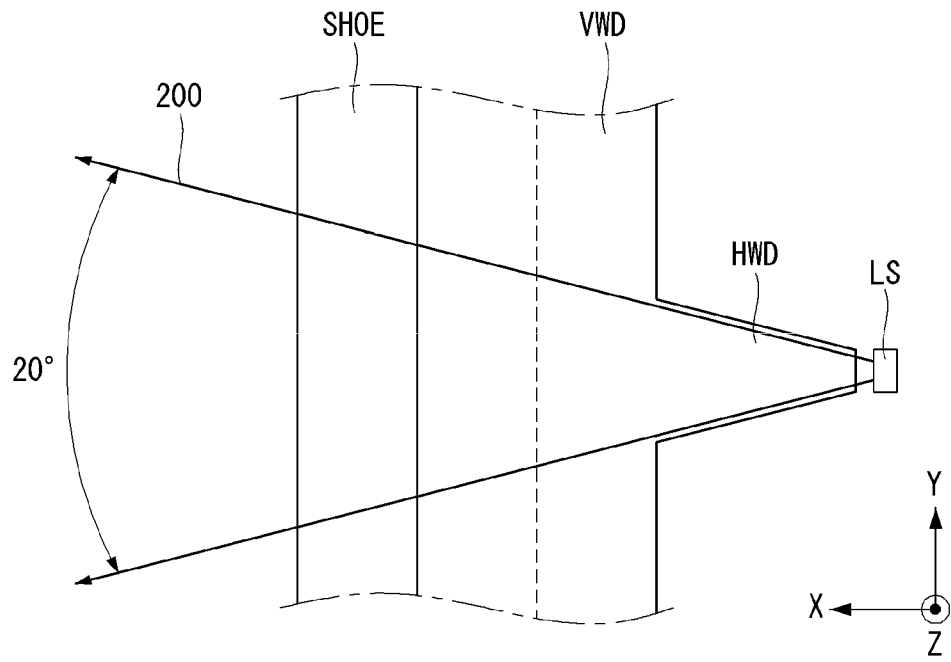
FIG. 10 is a horizontal side view, in XY plane, illustrating a light path by the light deflection element according to the present disclosure.

Hereinafter, referring to FIGS. 9 and 10, we will explain about the function and/or the operation of the light deflection element SHOE according to the present disclosure. FIG. 9 is a vertical side view, in the XZ plane, illustrating a light path by a light deflection element according to the present disclosure. FIG. 10 is a horizontal side view, in XY plane, illustrating a light path by the light deflection element according to the present disclosure.

Referring to FIG. 9, the light deflection element SHOE according to the first embodiment of the present disclosure is disposed under the bottom surface of the high refractive layer HR as facing with the wedge light coupler WLC. The light deflection element SHOE dose not affect to the expanding property in the horizontal plane of the vertical semi-collimated light 100, but it converts the vertical semi-collimated light 100 into a vertical collimated light 200 in the vertical plane, which satisfies the total reflection condition in the high refractive layer HR. For example, the light deflection element SHOE may be an optical element having a holographic pattern by which the vertical collimated light 200 has an incident angle (or reflection angle) Ta1 larger than the critical angle for total reflection $T_{HR\_AIR}$ at the interface between the high refractive layer HR and the air and the critical angle for total reflection $T_{HR\_LR}$ at the interface between the high refractive layer HR and the low refractive layer LR. In one example, when the semi-collimated angle Vcoll of the vertical semi-collimated light 100 is about 60 degree, the light deflection element SHOE may change the vertical semi-collimated light 100 into the vertical collimated light 200 having the first total reflection angle Ta1 of 71 degree. As the results, the vertical collimated light 200 having the first total reflection angle Ta1 may be guided to the opposite direction to the wedge light coupler WLC by repeating of the total reflection.

Referring to FIG. 10, the light deflection element SHOE does not affect to the optical characteristics of the vertical collimated light 200 on the horizontal plane. That is, on the horizontal plane, the vertical collimated light 200 may go to the light changing part LRE as having the expanding angle of 20 degree.

Figure 11:
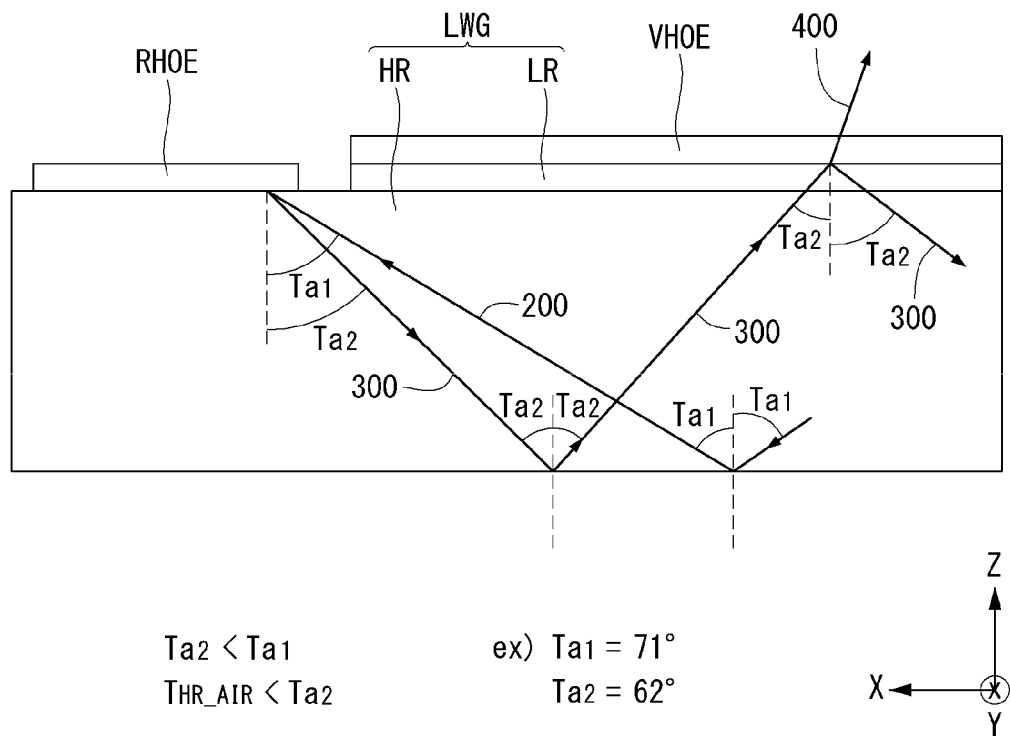
FIG. 11 is a vertical side view, in XZ plane, illustrating the changes of the light paths at a light guiding part, a light changing part and a light radiating part according to the present disclosure.
Figure 12:
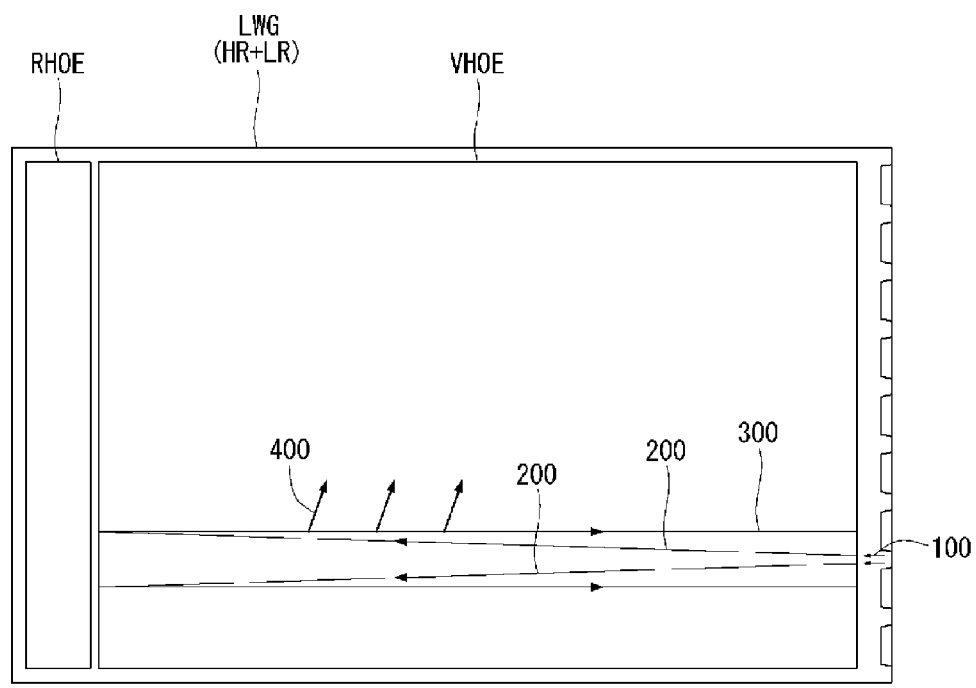
FIG. 12 is a horizontal side view, in XY plane, illustrating the changes of the light paths at a light guiding part, a light changing part and a light radiating part according to the present disclosure.

Next, referring to FIGS. 11 and 12, we will explain about the function and/or the operation of the light guiding part LWG, the light changing part LRE and the light radiating part LOT. FIG. 11 is a vertical side view, in XZ plane, illustrating the changes of the light paths at a light guiding part, a light changing part and a light radiating part according to the present disclosure. FIG. 12 is a horizontal side view, in XY plane, illustrating the changes of the light paths at a light guiding part, a light changing part and a light radiating part according to the present disclosure.

Referring to FIG. 11, the vertical collimated light 200 having the first total reflection angle Ta1 as the reflection (or incident) angle is guided from the light entering part LIN to the light changing part LRE by repeating the total reflection in the high refractive layer HR. For example, the vertical collimated light 200 is the collimated light on the vertical plane (XZ plane) as having the 71 degree of the first total reflection angle Ta1. At the light changing part LRE, the light reflecting element RHOE is disposed by which the vertical collimated light 200 is re-reflected after changing the first total reflection angle Ta1 of the vertical collimated light 200. The light reflecting element RHOE converts the first total reflection angle Ta1 of the vertical collimated light 200 into a reflected light 300 having a second total reflection angle Ta2, and then sends back it into the high refractive layer HR.

The second total reflection angle Ta2 may preferably be the angle which satisfies the total reflection condition at the interface between the high refractive layer HR and the air, and breaks the total reflection condition at the interface between the high refractive layer HR and the low refractive layer LR. As the results, the reflected light 300 may be totally reflected at the bottom surface of the high refractive layer HR, but not totally reflected at the interface between the high refractive layer HR and the low refractive layer LR. Some of the reflected light 300 may enter into the low refractive layer LR, and, not shown in figures, others of the reflected light 300 may be reflected into the high refractive layer HR. That is, the light reflecting element RHOE converts the vertical collimated light 200 guided within the high refractive layer HR into the reflected light 300 so that some of the reflected light 300 can be radiated through one surface of the high refractive layer HR.

The light radiating part LOT is disposed on the upper surface of the low refractive layer LR. The light radiating part LOT may preferably be a light radiating film VHOE for radiating some of the reflected lights 300 entering into the low refractive layer LR and for reflecting others of the reflected lights 300 into the low refractive layer LR again. For example, the light radiating film VHOE may be a volume grating film. By the light radiating film VHOE, some of the reflected lights 300 may be a back light 400 radiated out from the ultra thin film type back light unit according to the present disclosure. Others may be reentered into the light guide film LGF as the reflected lights 300.

Referring to FIG. 12, we will explain about the changes of the light path of the vertical collimated light 200 on the horizontal plane (XY plane). It is preferable that the light reflecting element RHOE may preferably be an optical film which collimates the vertical collimated light 200 on the horizontal plane (XY plane). For example, the light reflecting element RHOE may preferably be an optical element having a holographic pattern by which the incident angle of the vertical collimated light 200 is changed on the vertical plane (XZ plane) and the vertical collimated light 200 is collimated on the horizontal plane (XY plane) at the same time. Therefore, in the view of on the horizontal plane, the reflected lights 300 is collimated on the horizontal plane (XY plane) by the light reflecting element RHOE, goes back to the light entering part LIN and then some of the reflected lights 300 are radiated out as the back light 400. By controlling the distribution of the grating patterns in the light radiating film VHOE, the even ratio of the reflected lights 300 may preferably be radiated out as the back light 400. As the results, the back light 400 may have the even luminance distributions over the whole surface of the light guide film LGF.

Second Embodiment

Figure 13:
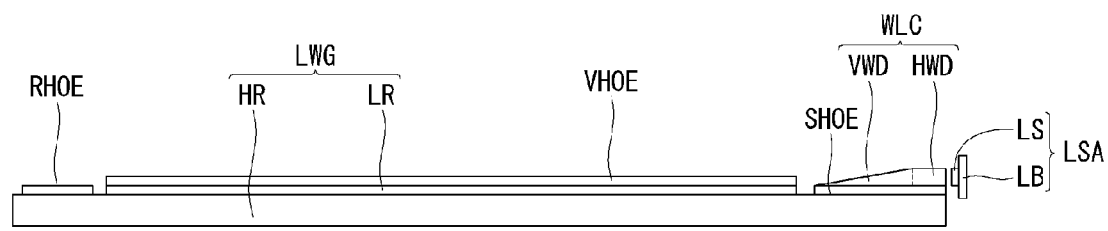
FIG. 13 is a side view illustrating a structure of an ultra thin film type back light unit according to the second embodiment of the present disclosure.

Hereinafter, referring to FIG. 13, we will explain about the ultra thin film type back light unit according to the second embodiment of the present disclosure. FIG. 13 is a side view illustrating a structure of an ultra thin film type back light unit according to the second embodiment of the present disclosure.

The basic structure of the elements of the ultra thin film type back light unit according to the second embodiment is very similar with that of the first embodiment. The main difference may be on the positions of each element.

Referring to FIG. 13, the ultra thin film type back light unit according to the second embodiment of the present disclosure comprises a light guide film LGF and a light source array LSA disposed at one side of the light guide film LGF. The light guide film LGF includes a light entering part LIN, a light guiding part LWG, a light changing part LRE and a light radiating part LOT. The light source array LSA includes a plurality of light sources LS and a light source board LB having the plurality of the light sources LS in certain array manner and a circuit for providing the electric power to the light sources LS.

The light entering part LIN comprises a wedge light coupler WLC and a light deflection element SHOE. The light guiding part LWG may include a high refractive layer HR and a low refractive layer LR. On the upper surface of the high refractive layer HR, the light entering part LIN is disposed at the side close to the light source LS, and the light changing part LRE is disposed at the opposite side.

More detail, on the upper surface of the high refractive layer HR, at the side where the light entering part LIN is located, the light deflection element SHOE and the wedge light coupler WLC are stacked. On the upper surface of the high refractive layer HR, at the side where the light changing part LRE is located, a light reflecting element RHOE is disposed. On the upper surface of the high refractive layer HR, the low refractive layer LR is disposed between the light deflection element SHOE and the light reflecting element RHOE. Further, a light radiating film VHOE is stacked on the upper surface of the low refractive layer LR.

Even though not shown in figures, a light absorbing pattern may be further included between the light deflection element SHOE and the light radiating film VHOE. The light absorbing pattern is preferably stacked on the low refractive layer LR rather than on the high refractive layer HR. Therefore, in the case the light absorbing patter is included, the low refractive layer LR may preferably be extended to the side where the light deflection element SHOE is located as being longer than the light radiating film VHOE, and the light absorbing pattern may preferably be located on the extended portion of the low refractive layer LR.

Even though the structure of the ultra thin film type back light unit according to the second embodiment is different from that of the first embodiment, the light path of the lights provided from the light source LS according to the second embodiment is the same with that of the first embodiment. Therefore, the explanation for the light path is not duplicated.

Third Embodiment

Figure 14:
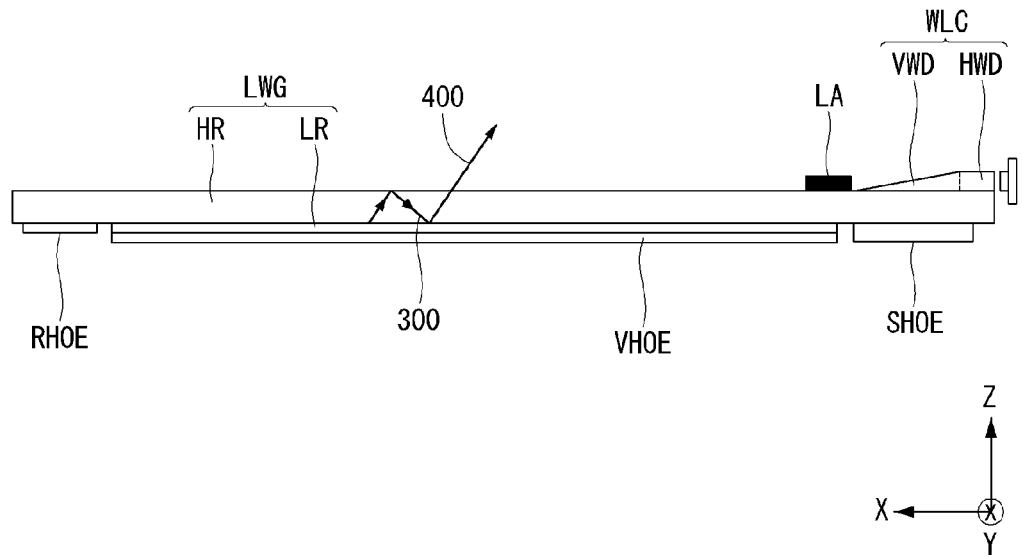
FIG. 14 is a side view illustrating a structure of an ultra thin film type back light unit according to the third embodiment of the present disclosure.

Hereinafter, referring to FIG. 14, we will explain about the ultra thin film type back light unit according to the third embodiment of the present disclosure. FIG. 14 is a side view illustrating a structure of an ultra thin film type back light unit according to the third embodiment of the present disclosure.

The ultra thin film type back light unit according to the third embodiment is the case that a reflective type light radiating film VHOE is applied. The basic elements of the ultra thin film type back light unit according to the third embodiment are very similar with those of the first embodiment or the second embodiment. The differences are the locations of elements.

Referring to FIG. 14, the ultra thin film type back light unit according to the third embodiment of the present disclosure comprises a light guide film LGF and a light source array LSA disposed at one side of the light guide film LGF. The light guide film LGF includes a light entering part LIN, a light guiding part LWG, a light changing part LRE and a light radiating part LOT. The light source array LSA includes a plurality of light sources LS and a light source board LB having the plurality of the light sources LS in certain array manner and a circuit for providing the electric power to the light sources LS.

The light entering part LIN comprises a wedge light coupler WLC, a light deflection element SHOE and a light absorbing pattern (or 'light absorbing element') LA. The light guiding part LWG may include a high refractive layer HR and a low refractive layer LR. On the upper surface of the high refractive layer HR, the light entering part LIN is disposed at the side close to the light source LS, and the light changing part LRE is disposed at the opposite side.

More detail, on the upper surface of the high refractive layer HR, at the side where the light entering part LIN is located, the wedge light coupler WLC is stacked. Under the bottom surface of the high refractive layer HR, at the side where the light entering part LIN is located, the light deflection element SHOE is stacked as facing with the wedge light coupler WLC. Under the bottom surface of the high refractive layer HR, at the side where the light changing part LRE is located, the light reflecting element RHOE is disposed. Under the bottom surface of the high refractive layer HR, the low refractive layer LR is disposed between the between the light deflection element SHOE and the light reflecting element RHOE. Further, under the bottom surface of the low refractive layer LR, a light radiating film VHOE is stacked. Especially, the light radiating film VHOE may preferably be a reflective pattern so as that the back light 400 is radiated to the +Z axis direction.

It is preferably that the light absorbing pattern LA is disposed between the wedge light coupler WLC and the high refractive layer HR, on the upper surface of the high refractive layer HR. In some cases, the light absorbing pattern LA may be omitted.

First Applicable Example

Figure 15:
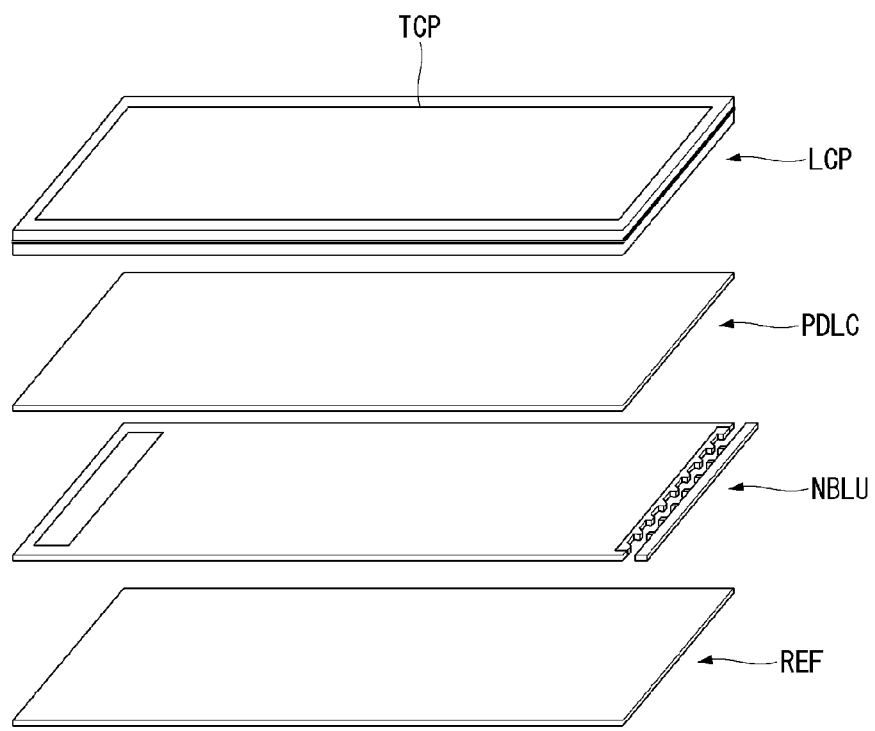
FIG. 15 is a perspective view illustrating the first applicable example of the liquid crystal display having the ultra thin film type back light unit according to the present disclosure.

Hereinafter, referring to FIG. 15, we will explain about the first applicable example of the liquid crystal display in which the ultra thin film type back light unit according to the present disclosure. FIG. 15 is a perspective view illustrating the first applicable example of the liquid crystal display having the ultra thin film type back light unit according to the present disclosure.

The first applicable example as shown in FIG. 15 relates to a liquid crystal display in which a user can select a privacy mode and a generic mode. The liquid crystal display comprises a liquid crystal display panel LCP and a narrow viewing angle back light unit NBLU according to the present disclosure. Under the bottom surface of the liquid crystal display panel LCP, the narrow viewing angle back light unit NBLU is disposed. The narrow viewing angle back light unit NBLU according to the present disclosure provides the back lights having the narrow viewing angle by which the display information is suggested to a person located just in front of the display. Therefore, with the narrow viewing angle back light unit NBLU only, the liquid crystal display cannot be selected between the privacy mode and the general mode.

The liquid crystal display according to the first applicable example further includes a switchable light scattering element PDLC such as a Polymer Dispersed Liquid Crystal disposed between the liquid crystal display panel LCP and the narrow viewing angle back light unit NBLU. For example, when the switchable light scattering element PDLC is set in 'Off' condition, the narrow viewing angle back light unit NBLU is only activated so that the liquid crystal display works in the privacy mode. On the contrary, when the switchable light scattering element PDLC is set in 'On' condition, the back lights provided from the narrow viewing angle back light unit NBLU are scattered by the switchable light scattering element PDLC so that the liquid crystal display works in the general mode.

The liquid crystal display according to the first applicable example may further include a reflective sheet REF under the bottom surface of the narrow viewing angle back light unit NBLU. The reflective sheet REF is for enhancing the efficiency of the back light in the general mode, as it reflects the leaked back lights to the front side of the liquid crystal display.

Using the liquid crystal display according to the first applicable example, users can select the privacy mode and the general mode by switching the back light unit, especially the switchable light scattering element PDLC which is disposed under the liquid crystal display panel LCP. Therefore, when any additional film or plate such as the touch panel TCP is attached on the liquid crystal display, the touch function can be normally operated in the privacy mode and in the general mode.

Second Applicable Example

Figure 16:
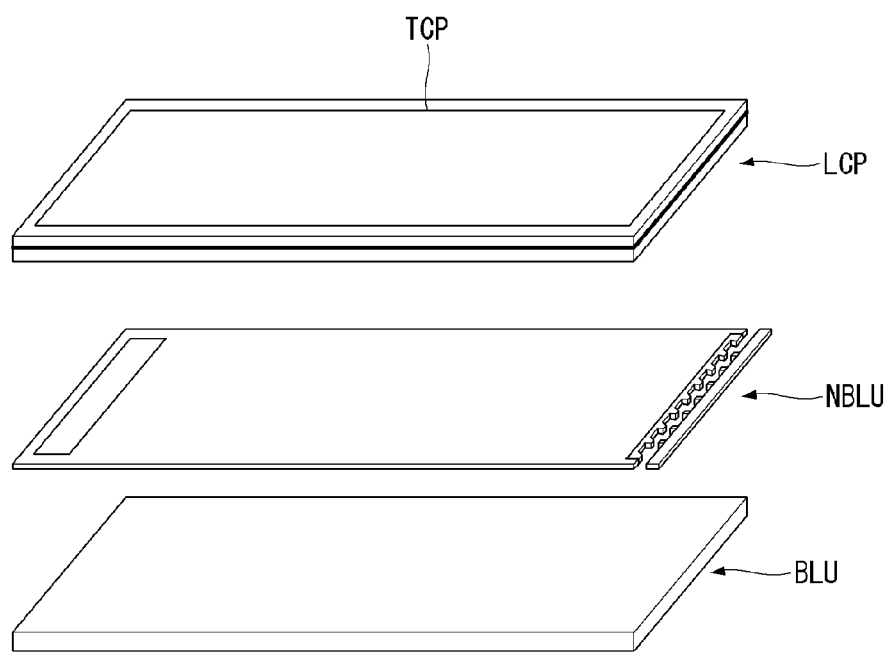
FIG. 16 is a perspective view illustrating the second applicable example of the liquid crystal display having the ultra thin film type back light unit according to the present disclosure.

Hereinafter, referring to FIG. 16, we will explain about the second applicable example of the liquid crystal display in which the ultra thin film type back light unit according to the present disclosure. FIG. 16 is a perspective view illustrating the second applicable example of the liquid crystal display having the ultra thin film type back light unit according to the present disclosure.

The second applicable example as shown in FIG. 16 also relates to a liquid crystal display in which a user can select a privacy mode and a generic mode. The liquid crystal display comprises a liquid crystal display panel LCP and a narrow viewing angle back light unit NBLU according to the present disclosure. Under the bottom surface of the liquid crystal display panel LCP, the narrow viewing angle back light unit NBLU is disposed. The narrow viewing angle back light unit NBLU according to the present disclosure provides the back lights having the narrow viewing angle by which the display information is suggested to a person located just in front of the display. Therefore, with the narrow viewing angle back light unit NBLU only, the liquid crystal display cannot be selected between the privacy mode and the general mode.

The liquid crystal display according to the second applicable example may further include a normal back light unit BLU under the narrow viewing angle back light unit NBLU. The normal back light unit BLU has the same structure and function with the conventional back light unit. When the narrow viewing angle back light unit NBLU is operated without the normal back light unit BLU, only the back lights having the narrow viewing angle are provided to the liquid crystal display panel LCP. Therefore, the liquid crystal display is operated in the privacy mode. When the normal back light unit BLU is turn 'On', then the liquid crystal display is operated in the general mode. In the general mode, the operation status of the narrow viewing angle back light unit NBLU may not affect the mode selection. When the normal back light unit BLU and the narrow viewing angle back light unit NBLU are turn 'On' at the same time, the liquid crystal display is operated in the general mode by the back lights from the normal back light unit BLU providing the wide viewing angle back lights. The normal back light unit BLU may be the direct type back light unit DBLU or the edge type back light unit EBLU.

Using the liquid crystal display according to the second applicable example, users can select the privacy mode and the general mode by switching the back light unit, especially the normal back light unit BLU which is disposed under the liquid crystal display panel LCP. Therefore, when any additional film or plate such as the touch panel TCP is attached on the liquid crystal display, the touch function can be normally operated in the privacy mode and in the general mode.

The present disclosure suggests an ultra thin film type back light unit adopting a holography technology which can be easily applied to a non-self luminance flat panel display such as liquid crystal display. Further, the present disclosure suggests a back light unit which can be selectively operated in the general mode having the wide viewing angle and the privacy mode having the narrow viewing angle. The back light unit according to the present disclosure can be selectively used in the privacy mode without any additional optical film on the liquid crystal display. Therefore, in the liquid crystal display having the touch panel function, the privacy mode and the general mode can be selected without any obstacles for usage of the touch panel function. In addition, the present disclosure suggests the light system which can be selectively operated in the general light mode and the search light mode according to the usage environment or purpose.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A back light unit, comprising:
a light guide film including a light entering part disposed at one side, a light changing part disposed at other side and a light guiding part connecting the light entering part and the light changing part;
a light radiating part disposed on an upper surface of the light guide film; and
a light source disposed at the light entering part of the light guide film,
wherein the light entering part includes:
a wedge light coupler converting expanded incident lights provide from the light source into vertical semi-collimated lights having a narrow expanding angle on a horizontal plane and being semi-collimated on a vertical plane; and
a light deflection element converting the vertical semi-collimated lights received from the wedge light coupler into vertical collimated lights on the vertical plane satisfying a total reflection condition within the light guiding part,
wherein the light changing part includes: a light reflecting pattern for coverting the vertical collimated lights received from the light guiding part into collimated lights being further collimated on the horizontal plane, breaking the total reflection condition within the light guiding part and satisfying a total reflection condition at the interface with the light radiating part, and for sending the collimated lights to the light guiding part,
wherein the light radiating part includes: a light radiating film providing some of the collimated lights as back lights and reflecting others of the collimated lights into the light guiding part.

2. The back light unit according to the claim 1, further comprising:
a light absorbing pattern being disposed between the wedge light coupler and the light radiating part and absorbing some of the vertical collimated lights unsatisfying the total reflection condition within the light guiding part.

3. The back light unit according to the claim 1, wherein the light guiding part includes:
a high refractive film; and
a low refractive film attached on any one of an upper surface and a bottom surface of the high refractive film, and
wherein the light radiating pattern includes any one of a surface grating film and a volume grating film attaching on outer surface of the lower refractive film.

4. The back light unit according to the claim 1, wherein the wedge light coupler includes:
a horizontal wedge part disposed close to the light source; and
a vertical wedge part extended from the horizontal wedge part.

5. The back light unit according to the claim 4, wherein the horizontal wedge part includes:
a light incident surface disposed close to the light source and having a height and a width corresponding to a size of the light source;
an upper surface and a bottom surface extended to one direction with a distance and expanded with a expanded angle; and
two side surfaces having a height corresponding to the height of the light incident surface and a length corresponding to the certain distance,
wherein the vertical wedge part includes an inclined surface extended to the one direction from the horizontal wedge part in which the height of the two side surfaces are linearly reduced from the upper surface to the bottom surface along to a length of the vertical wedge part.

6. The back light unit according to the claim 5, wherein a plurality of the horizontal wedge part is disposed along to a side of the vertical wedge part which is perpendicular to the one direction, and
wherein a plurality of the light source is disposed close to a plurality of the light incident surface one by one.

7. The back light unit according to the claim 1, wherein the light guiding part sends the vertical collimated lights from the light entering part to the light changing part by repeating the total reflection, and
wherein the light guiding part refracts some of the collimated lights to the light radiating part and sends others of the collimated lights from the light changing part to the light entering part.

8. The back light unit according to the claim 1, wherein the wedge light coupler is disposed at one side close to the light source, on an upper surface of the high refractive film,
wherein the light deflection element is disposed under the bottom surface of the high refractive film as facing with the wedge light coupler,
wherein the low refractive film is attached on the upper surface of the high refractive film,
wherein the light reflecting pattern is disposed at an opposite side to the wedge light coupler, on the upper surface of the high refractive film, and
wherein the light radiating film is attached on an upper surface of the low refractive film.

9. The back light unit according to the claim 1, wherein the wedge light coupler is disposed at one side close to the light source, on an upper surface of the high refractive film,
wherein the light deflection element is disposed under the wedge light coupler, on an upper surface of the high refractive film,
wherein the low refractive film is attached on the upper surface of the high refractive film,
wherein the light reflecting pattern is disposed at an opposite side to the wedge light coupler, on the upper surface of the high refractive film, and
wherein the light radiating film is attached on an upper surface of the low refractive film.

10. The back light unit according to the claim 1, wherein the wedge light coupler is disposed at one side close to the light source, on an upper surface of the high refractive film,
wherein the light deflection element is disposed as facing with the wedge light coupler, under a bottom surface of the high refractive film,
wherein the low refractive film is attached close to the wedge light coupler, under the bottom surface of the high refractive film,
wherein the light reflecting pattern is disposed at an opposite side to the wedge light coupler, under the bottom surface of the high refractive film, and
wherein the light radiating film is attached under a bottom surface of the low refractive film.

11. The back light unit according to the claim 1, further comprising:
a switchable light scattering film disposed on the light guide film.

12. The back light unit according to the claim 1, further comprising:
any one of a direct type back light unit and an edge type back light unit disposed under the light guide film.

* * * * *